United States Patent [19]
Sato

[11] Patent Number: 6,009,078
[45] Date of Patent: Dec. 28, 1999

[54] ATM SWITCH DEVICE CAPABLE OF FAVORABLY CONTROLLING TRAFFIC CONGESTION

[75] Inventor: Noboru Sato, Tokyo, Japan

[73] Assignee: NEC Corporation, Tokyo, Japan

[21] Appl. No.: 08/797,569

[22] Filed: Feb. 7, 1997

[30] Foreign Application Priority Data

Feb. 9, 1996 [JP] Japan .................................... 8-023960

[51] Int. Cl.[6] .................................................. H04L 12/56
[52] U.S. Cl. .......................................... 370/232; 370/418
[58] Field of Search .................................... 370/229, 230, 370/231, 232, 233, 234, 235, 236, 250, 412, 413, 414, 415, 416, 417, 418, 432, 468

[56] References Cited

U.S. PATENT DOCUMENTS

| | | | |
|---|---|---|---|
| 4,849,968 | 7/1989 | Turner | 370/232 |
| 5,233,606 | 8/1993 | Pashan et al. | 370/418 |
| 5,455,820 | 10/1995 | Yamada | 370/413 |
| 5,509,001 | 4/1996 | Tachibana et al. | 370/230 |
| 5,539,747 | 7/1996 | Ito et al. | 370/235 |
| 5,541,912 | 7/1996 | Choudhury et al. | 370/412 |
| 5,550,823 | 8/1996 | Irie et al. | 370/413 |
| 5,577,035 | 11/1996 | Hayter et al. | 370/412 |
| 5,696,764 | 12/1997 | Soumiya et al. | 370/395 |
| 5,710,770 | 1/1998 | Kozaki et al. | 370/368 |

FOREIGN PATENT DOCUMENTS

| | | |
|---|---|---|
| 0 526 104 A2 | 2/1993 | European Pat. Off. . |
| 3-205937 | 9/1991 | Japan . |
| 4-26249 | 1/1992 | Japan . |
| 4-207543 | 7/1992 | Japan . |
| 5-153150 | 6/1993 | Japan . |
| 5-276189 | 10/1993 | Japan . |
| 6-62041 | 3/1994 | Japan . |
| 7-66845 | 3/1995 | Japan . |
| 8-242238 | 9/1996 | Japan . |
| 9-214512 | 8/1997 | Japan . |
| WO 93/19551 | 9/1993 | WIPO . |

*Primary Examiner*—Chi H. Pham
*Assistant Examiner*—Kwang B. Yao
*Attorney, Agent, or Firm*—Scully, Scott, Murphy & Presser

[57] ABSTRACT

In an ATM switch device having a plurality of input ports and a plurality of output ports, a port buffer is arranged for each of the output ports and is given a minimum guaranteed value which represents the minimum number of output cells sent to each output port even when traffic congestion takes place at the other output ports. A total queue monitoring buffer is also arranged to monitor a total number of output cells which is equal to a total sum of the minimum guaranteed values determined for the respective output ports and is counted up only when the counts of the port buffers exceed the minimum guaranteed values. With this structure, it is possible to detect traffic congestion all over the ATM switch device by the total queue monitoring buffer and to assure delivery of the output cells equal to the minimum guaranteed value. Each minimum guaranteed value may be determined for each service class and a multicast cell.

16 Claims, 12 Drawing Sheets

ATM SWITCH DEVICE CAPABLE OF FAVORABLY CONTROLLING TRAFFIC CONGESTION

BACKGROUND OF THE INVENTION

This invention relates to an ATM switch device and an ATM method for use in switching ATM cells in an ATM network.

In general, a conventional ATM switch device of the type described (includes an input port portion and an output port portion) is operable to receive an ATM cell as an input cell at an input port and to deliver the input cell to an output port as an output cell after the input cell is stored in the ATM switch device. Herein, it is to be noted that such an ATM cell has a fixed length of fifty-three bytes in total and is structured by a header of five bytes and a payload of forty-eight bytes. The header has indentifiers, such as VPI, VCI, and the like while the payload has a sequence of data signals, and so on.

In such an ATM network which uses an ATM cell of a fixed length, after an ATM cell is formed once, all cells have the same structure. Therefore, it is advantageous that the ATM network never recognizes a structure of an original information structure. Under the circumstances, it has been expected that the ATM network is suitable for multimedia communications.

In a method of transmitting an ATM cell through an ATM switch device, there are a wide variety of services, such as a constant bit rate (CBR) service, a variable bit rate (VBR) service, an available bit rate (ABR) service, an unspecified bit rate (UBR) service, and the like. Herein, it is to be noted that the CBR service is for transmitting a moving picture signal and an audio signal at a constant transmission rate while the VBR service is for varying a transmission rate of a moving picture signal and an audio signal at a real time. On the other hand, the ABR service is for varying a transmission rate in consideration of traffic congestion of an ATM network while the UBR method is for carrying out transmission without specifying a transmission rate.

In considering a variety of the methods, it is preferable that the ATM switch device is matched with all of the above-mentioned methods. In other words, the ATM switch device can desirably distinguish all of the methods from one another as service classes to carry out control operation which corresponds to each of the service classes.

Moreover, it should be considered that the ATM cells which is supplied to and transmitted from the ATM switch device are classified into a single cast cell which is sent to a single output port and an a multicast cell which is simultaneously delivered to a plurality of output ports. Accordingly, it is preferable that the ATM switch device can not only process the single cast cell but also can process the multicast cell.

Herein, proposal has been made about a wide variety of ATM switch devices which are divided into three groups. One of the groups is of a type which includes a plurality of input ports and a plurality of input buffers arranged for the respective input ports to store the input cells while another one of the groups is of a type which includes a plurality of output ports arranged for the respective output ports to store the output cells. The last one of the groups is of a type which includes a shared buffer shared by a plurality of output ports and which will be referred to as a shared buffer type hereinafter.

Among others, a recent interest has been directed to the ATM switch device of the shared buffer type because it is excellent in comparison with the other groups of the ATM switch devices in view of the fact that the shared buffer can reduce a memory capacity.

At any rate, all the ATM switch devices have a common problem that the ATM cells are discarded when traffic congestion takes place at a certain output port, which causes an overflow to occur in the input, the output, and the shared buffers.

This problem will be mentioned about the shared buffer type in detail hereinunder. Such an ATM switch device of the shared buffer type is disclosed, for example, in Japanese Patent Unexamined Publication No. Hei 5-153,150, namely, 153,150/1993 (will be referred to as Reference). The ATM switch device disclosed therein includes a shared buffer shared by a plurality of output ports to store each cell and an address administration buffer arranged for each of the output port to store an address of the shared buffer assigned to each cell. In addition, an idle address buffer is also included to store an idle address of the shared buffer.

Furthermore, description is made in Reference about a conventional ATM switch device which includes a threshold value monitoring unit. The threshold value monitoring unit monitors whether or not an activity ratio of each address administration buffer exceeds a threshold value set therein. In addition, the threshold value monitoring unit produces a cell discard indication when the the activity ratio exceeds the threshold value. The cell discard indication is sent to a cell discard unit and, as a result, the cell in question is discarded.

From this fact, it is readily understood that selective discard is made about the cell which is directed to the output port corresponding to one of the address administration buffers that exceeds the threshold value and that the threshold values are determined for the respective output ports. With this structure, the cells are discarded even when the conventional ATM switch device as a whole affords to receive and transmit the cells. Therefore, discarding the cells comparatively frequently happens in the conventional ATM switch device.

In order to reduce cell discard as small as possible, Reference proposes a method of monitoring a total amount of cells stored in the shared buffer shared by the output ports. In this method, when a load begins to be concentrated on a specific one of the output ports with the total amount of the stored cells exceeding a predetermined value, an input regulation or restriction is imposed on the shared buffer.

In other words, when the total amount of the stored cells exceeds the predetermined value, the input regulation is made in this method about the cells which are maximum in number and which are delivered to the specific output port. As a result, the cells delivered to the specific output port are discarded during the input regulation or restriction even when the cells are to be quickly processed in a real time.

As mentioned above, this method detects the specific output port to which a maximum number of cells is delivered. In addition, the cells to be delivered to the specific output port are subjected to regulation or restriction and are consequently discarded as long as the total amount of the stored cells exceeds the predetermined value. Such regulation or restriction state is continued in connection with the specific output port until the total amount of the stored cells becomes equal to or smaller than the predetermined value.

This brings about inconvenience that the cell regulation of the specific output port is not released or stopped when the total amount of the cells is kept over the predetermined value by an increase of the cells directed to the output ports other than the specific output port in spite of a decrease of the cells directed to the specific output port.

Moreover, no consideration is made at all in Reference about input regulation to be carried out in the cases where the different service classes are present and where the multicast cell is present together with the single cast cell. In addition, no teaching is also made about the case where each output port has a different concentration of the cells to be allowed.

SUMMARY OF THE INVENTION

It is an object of this invention to provide an ATM switch device which is capable of reducing an influence of a cell concentration imposed on a certain output port.

It is another object of this invention to provide an ATM switch device of the type described, wherein cell transfer may not be completely stopped at each output port even when traffic congestion takes place in the ATM switch device.

It is still another object of this invention to provide an ATM switch device of the type described, which is capable of conveniently dealing with traffic congestion in different service classes.

It is yet another object of this invention to provide an ATM switch device of the type described, which can process traffic congestion not only in a single cast cell but also in a multicast cell.

An ATM switch device to which this invention is applicable is operable in response to a plurality of cells to transmit selected cells to a selected one of output ports after storage of each of the cells, with traffic congestion controlled. According to an aspect of this invention, the ATM switch device comprises port cell counting means which corresponds to the selected one of the output ports and which has a minimum acceptable number representative of the number of the cells accepted at a minimum for the selected one of the output ports, for successively counting the selected cells in number to form a queue related to the output port, total cell counting means, which has a total maximum number of the cells accepted at a maximum for the ATM switch, for counting a total number of the cells received by the ATM switch device, and control means for controlling the traffic congestion in the ATM switch device with reference to not only the total maximum number of the cells but also the minimum acceptable number of the selected cells.

According to another aspect of this invention, an ATM switch device comprises a plurality of input ports, a plurality of output ports, and a shared memory shared by the plurality of the output ports and which is operable to receive an ATM cell to send the same as an output cell to a selected output port through the shared buffer, the ATM switch device comprises port queue counting means corresponding to the output port portion, for counting the cell in number as a queue arranged at each output port of the output port portion, means for setting a minimum acceptable number of the count in each port queue counting means, detecting means for detecting whether or not the count exceeds the minimum acceptable number, and total queue counting means which keeps an initial value equal to a total number of each minimum acceptable numbers, for storing a total queue number by counting a variation of the cell number when the counts of the port queue counting means exceeds the initial value.

According to a further aspect of this invention, a method is for use in controlling an ATM switch device which comprises a plurality of output ports and a shared memory which is shared by the plurality of the output ports. The method comprises the steps of monitoring a minimum guaranteed value at every one of the output ports and controlling congestion of each output port with reference to the minimum guaranteed value of each output port. In this event, a total number of the cells may be monitored to control the traffic congestion.

DESCRIPTION OF THE PREFERRED EMBODIMENTS

Figure 1:
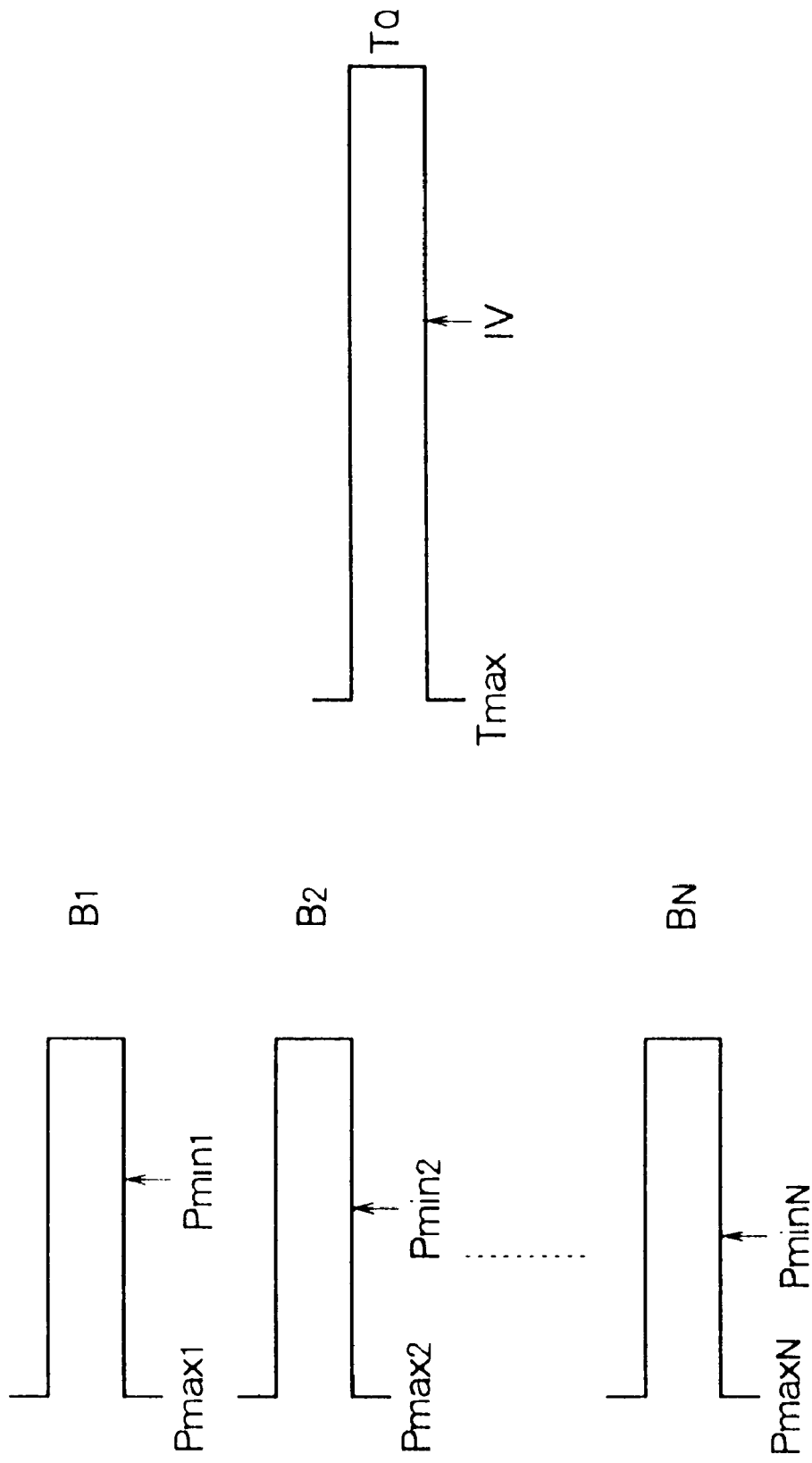
FIG. 1 is a schematic view for use in describing a principle of an ATM switch device according to a first embodiment of this invention.

Referring to FIG. 1, description will be schematically made about a principle of an ATM switch device according to a first embodiment of this invention. In FIG. 1, the ATM switch device is specified by first through N-th output port buffers B1 to BN which are in one-to-one correspondence to first through N-th output ports O1 to ON and which store in the form of queues cells which are to be delivered to the first through the N-th output ports O1 to ON, where N is an integer greater than unity. In addition, the illustrated ATM switch device comprises a total queue monitoring buffer TQ for monitoring a total queue stored in the first through the N-th output port buffers B1 to BN in a manner to be described later in detail.

It is assumed that all the first through the N-th output ports O1 to ON belong to a common or a single service class defined by the CBR scheme.

In the illustrated example, the first through the N-th output port buffers B1 to BN are given first through N-th minimum guaranteed values or numbers Pmin1 to PminN of cells as port threshold values. Each of the first through the N-th minimum guaranteed values Pmin1 to PminN defines a minimum value to which transmission of cells is guaranteed in each of the first through the N-th output port buffers B1 to BN.

In this example, the cells can be transmitted through a certain one of the output ports O1 to ON even when traffic congestion takes place at another output port, provided that the number of the cells stored in the one of the output port buffers B1 to BN that corresponds to the certain output port is smaller than the one of the first through the N-th minimum guaranteed values Pmin1 to PminN that corresponds to the one output port buffer. Briefly, transmission of the cells can be carried out within the minimum guaranteed values Pmin1 to PminN through each of the output ports O1 to ON even when the traffic congestion occurs in connection at another output port O1 to ON.

Each of the first through the N-th minimum guaranteed values Pmin1 to PminN may be individually differently determined in consideration of traffic of each of the first through the N-th output ports O1 to ON or may be equal to one another.

On the other hand, the total queue monitoring buffer TQ is given an initial value IV which may be equal to a total sum of the first through the N-th minimum guaranteed values Pmin1 to PminN in the illustrated example.

The illustrated total queue monitoring buffer TQ can count a total cell number of cells stored in the first through the N-th output port buffers B1 to BN to a total sum of maximum cell values Pmax1 to PmaxN which are determined by each capacity of the first through the N-th output port buffers B1 to BN.

However, the total queue monitoring buffer TQ may have a maximum count value which is smaller than the total sum of the maximum cell values. This is because cell discard might not almost occur, if the cells can be counted to a value which is equal to an average value of a sum of total cells stored for the whole output ports and a margin value. With this structure, a memory capacity can be reduced in the total queue monitoring buffer TQ. However, the total queue monitoring buffer TQ must be able to count the cells to a value more than the total sum of the minimum guaranteed values Pmin1 to PminN.

In the example being illustrated, it is to be noted that, when a single one of the input cells is received by the ATM switch device to be destined to a selected one of the output ports O1 to ON, one of the output port buffers B1 to BN that corresponds to the input cell is counted up by one but the total queue monitoring buffer TQ is kept unchanged in its content as long as the number of cells for each output port is smaller than each of the minimum guaranteed values Pmin1 to PminN.

On the other hand, when the cells are concentrated at the selected output port and, as a result, the content of the selected output port exceeds its minimum guaranteed value, the total queue monitoring buffer TQ is counted up or incremented by one.

To the contrary, when a single one of the cells is transmitted or read out through one of the output ports, the content of the corresponding output port buffer is reduced by one. In this case, when the content of the corresponding output port buffer exceeds its minimum guaranteed value, the content of the total queue monitoring buffer TQ is also decremented by one.

Thus, the minimum guaranteed values are determined in the respective output ports. With this structure, even when the traffic congestion takes place at a plurality of the output ports, transmission of the cells can be assured within each of the minimum guaranteed values of the remaining output ports. In addition, this structure can carry out control operation in consideration of a traffic state at each output port.

Therefore, it is possible to remove conventional defects as mentioned in conjunction with Reference cited in the preamble of the instant specification.

Figure 2:
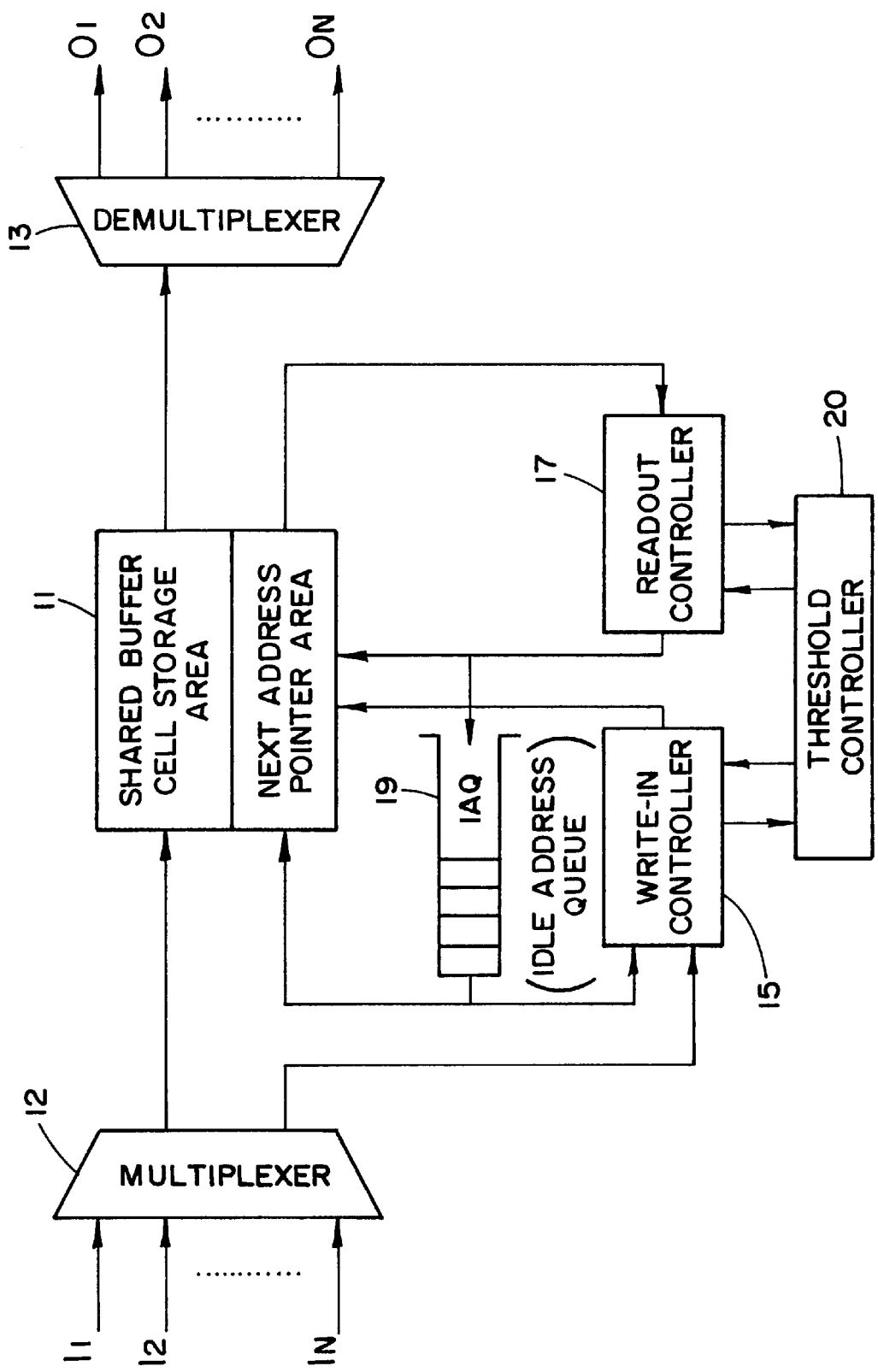
FIG. 2 is a block diagram of an ATM switch device structured on the basis of the principle described with reference to FIG. 1.

Referring to FIG. 2, description will be made about an ATM switch device according to a first embodiment of this invention, which is structured on the basis of the above-mentioned principle. The illustrated ATM switch device has first through N-th input ports I1 to IN, first through N-th output ports O1 to ON, and a shared buffer 11. The shared buffer 11 is connected to the input ports I1 to IN through a multiplexer 12 on one hand and is connected to the output ports O1 to ON through a demultiplexer 13 on the other hand, as shown in FIG. 2.

Moreover, the shared buffer 11 has a cell storage area and a next address pointer area which stores, as a next pointer, a next address for a next output cell and which is divided into a plurality of partial areas corresponding to the respective output ports. The all storage area of the shared buffer 11 keeps minimum guaranteed areas which corresponds to the minimum guaranteed values Pmin1 to PminN determined for the responsive output ports O1 to ON.

The illustrated ATM switch device further includes a write-in controller 15, a readout controller 17, an idle address queue buffer 19, and a threshold controller 20.

In FIG. 2, each of the input ports I1 to IN is supplied as the input cell with an ATM cell of fifty-three bytes which are divided into a header of 5 bytes and a payload of 48 bytes. In the illustrated example, each input cell is subjected to header conversion in a known manner before it is given to the multiplexer 12, although such a converter is not shown in this figure. As a result, a converted header is supplied to the multiplexer 12 along with the payload. In the multiplexer 12, routing information is separated from the remaining part of the converted header and is sent to the write-in controller 15. The remaining part of the converted header is sent to the shared buffer 11.

Alternatively, the header conversion may be carried out after the input cell is multiplexed by the multiplexer 12. In any event, the routing information is given to the write-in controller 15.

The write-in controller 15, which receives the routing information, includes a routing decoder for decoding the routing information and a plurality of write-in address registers prepared for the respective output ports. In the write-in address registers, each next following address of the shared buffer 11 is stored in one-to-one correspondence to the output ports O1 to ON.

Herein, a write-in operation of the ATM switch device will be described with reference to FIG. 2. Responsive to the routing information, the write-in controller 15 decodes the routing information to select one of the write-in address registers that corresponds to the routing information and that also corresponds to one of the output ports.

Inasmuch as the selected write-in address register stores a next shared buffer address which stores a next output cell to be delivered to the corresponding output port, the next shared buffer address is read out of the selected write-in address register and is sent to the shared buffer 11.

Simultaneously, an idle address which is stored in the idle address queue buffer 19 is read out and is stored in the next address pointer area of the common memory 11 as an address pointer which points out the next following address corresponding to the selected output port. The address pointer which is representative of the idle address is also sent to the selected write-in address register of the write-in controller 15 and is renewed into a renewed address.

From the above, it is readily understood that the cells for each output port form a list structure in both the cell storage area of the shared buffer 11 and the next address pointer area thereof.

Subsequently, description will be made about a readout operation which is carried out to read each of the output cells.

In FIG. 2, the readout controller 17 includes an output port indicator and readout address registers which are in one-to-one correspondence to the output ports O1 to ON. Let one of the readout address registers of the readout controller 17 be indicated or selected by the output port indicator. In this event, the selected readout address register stores a readout address which is placed at the leading position of a list structure formed at every one of the output ports O1 to ON. The readout address is delivered to the shared buffer 11 to read a cell out of the readout address. The cell which is indicated by the readout address is sent through the demultiplexer 13 to a corresponding one of the output ports O1 to ON. Consequently, the readout address of the shared buffer 11 becomes idle or empty. Concurrently, a next following address is read out of the next address pointer area of the shared buffer 11 and sent to the readout controller 17 to be stored into the corresponding readout address register of the readout controller 17.

As mentioned before, the readout address of the shared buffer 11 is rendered into an empty state. Therefore, the readout address is stored as an idle address in the idle address buffer 19 and the content of the readout address is erased or released in the shared buffer 11. In this manner, the cells which have a list structure at every output port the shared buffer 11 are successively read out of the shared buffer 11 in order determined in the list structure.

Furthermore, the threshold controller 20 included in the ATM switch device controls the write-in controller 15 and the readout controller 17 in a manner to be described hereinunder.

Figure 3:
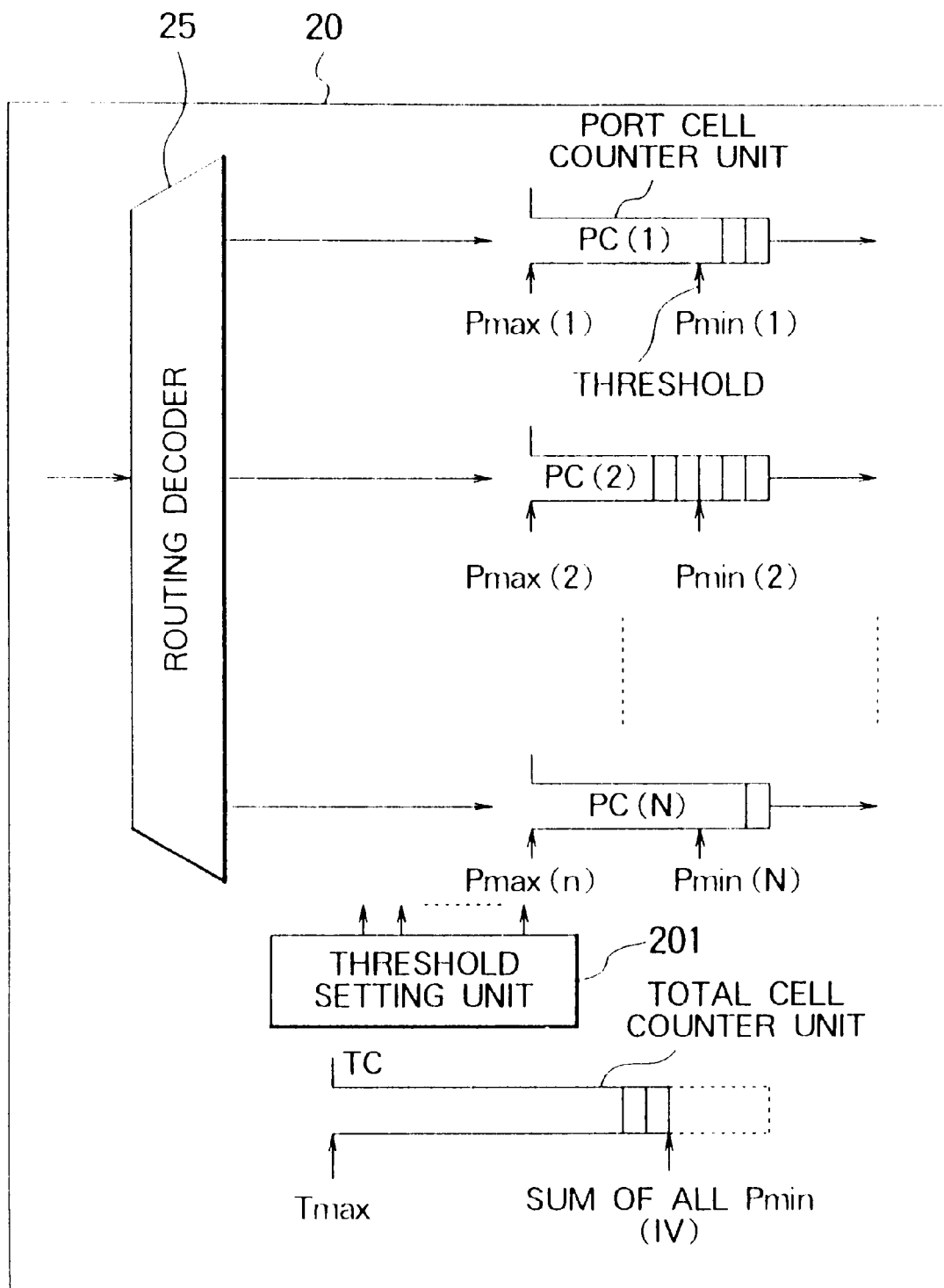
FIG. 3 is a block diagram for use in describing a part of the ATM switch device illustrated in FIG. 2 in detail.

Referring to FIG. 3 afresh together with FIG. 2, description will be made about a control operation of the threshold controller 20. As shown in FIG. 3, the threshold controller 20 includes first through N-th port cell counter units PC(1) to PC(N) and a total cell counter unit TC which are similar in operation to the first through the N-th port buffers B1 to BN and the total queue monitoring buffer TQ illustrated in FIG. 1, respectively.

In FIG. 3, the threshold controller 20 is connected to the write-in controller 15 and the readout controller 17 through a routing decoder 25. Specifically, the threshold controller 20 includes the first through the N-th port cell counter units PC(1) to PC(N) connected to the write-in controller 15 and the readout controller 17 through the routing decoder 25.

When one of the write-in address registers in the write-in controller 15 is selected in correspondence to an indicated one of the output ports O1 to ON, a count-up signal is delivered to a corresponding one of the first through the N-th port cell counter units PC(1) to PC(N) from the routing decoder 25. Consequently, each of the first through the N-th port cell counter units PC(1) to PC(N) successively counts the count-up signal one by one. To the contrary, when one of the readout address registers in the readout controller 17 is selected in correspondence to one of the output ports O1 to ON, a count-down signal is given to a corresponding one of the port cell counter units PC(1) to PC(N) to reduce the content of the corresponding port cell counter unit one by one.

In the threshold controller 20, a threshold setting unit 201 is included to set first through N-th minimum guaranteed values Pmin1 to PminN to the first through the N-th port cell counter units PC(1) to PC(N) in correspondence to the first through the N-th output ports O1 to ON, respectively.

The first through the N-th minimum guaranteed values Pmin1 to PminN are equivalent to those illustrated in FIG. 1 and may be equal to one another or may be different from one another. At any rate, the first through the N-th minimum guaranteed values are determined in consideration of traffic in the first through the N-th output ports O1 to ON. The first through the N-th port cell counter units PC(1) to PC(N) supply output signals to the write-in controller 15 or the readout controller 17 in response to a request issued from the write-in controller 15 or the readout controller 17, when the contents or the counts of the port cell counter units PC(1) to PC(N) exceed the first through the N-th minimum guaranteed values Pmin1 to PminN. In addition, the first through the N-th port cell counter units PC(1) to PC(N) have first through N-th maximum values Pmax(1) to Pmax(N), respectively, and can count the cells to the respective maximum values Pmax(1) to Pmax(N).

Furthermore, the illustrated threshold controller includes a total cell counter unit TC which may be made to correspond to the total queue monitoring buffer TQ shown in FIG. 1 and which may be operable in a manner similar to the latter. Like in the total queue monitoring buffer TQ, an initial value IV is set into the total cell counter unit TC and is equal to a total sum of the first through the N-th minimum guaranteed values Pmin1 to PminN set in the first through the N-th port cell counter units PC(1) to PC(N). The total cell counter unit TC has a maximum value which is determined by the memory capacity of the shared buffer 11. Therefore, the total cell counter unit TC can count the cells from the initial value IV to the maximum value determined by the memory capacity of the shared buffer 11 one by one.

Specifically, the total cell counter unit TC is counted up by one only when a total sum of the cells counted by the first through the N-th port cell counter units PC(1) to PC(N) exceeds the total sum of the first through the N-th minimum guaranteed values Pmin1 to PminN. In other words, the total cell counter unit TC is not counted up as long as the total sum of the cells does not exceed the initial value IV. On the other hand, when a cell is delivered to a certain one of the output ports and the content of the corresponding port cell counter unit exceeds the minimum guaranteed value determined by the certain output port, the total counter unit TC which is counted to a value over the initial value IV is counted down by one.

On the other hand, let output cells be concentrated at a particular one of the output ports O1 to ON and the number of the cells for the particular output port exceed the maximum value determined for the corresponding port cell counter unit. In this event, input regulation or restriction is carried out in connection with the particular output port even when the total sum of the cells does not reach the initial value.

With this structure, even when traffic congestion occurs at a specific one of the output ports, the other output ports can transmit output cells, if the number of cells is smaller than within the minimum guaranteed values determined for the other output ports.

In addition, when the input regulation is imposed at the output port because the number of cells exceeds one of the first through the N-th maximum values that is determined for the output port, such input regulation can be quickly released when the number of cells is smaller than the maximum value determined for the output port. Thus, the first through the N-th maximum values Pmax1 to PmaxN are individually determined for the respective output ports in the illustrated example. Determination of each maximum value serves to shorten input regulation times of the first through the N-th output ports, as compared with the case where only the total amount of cells is monitored like in Reference mentioned in the preamble of the instant specification.

Figure 4:
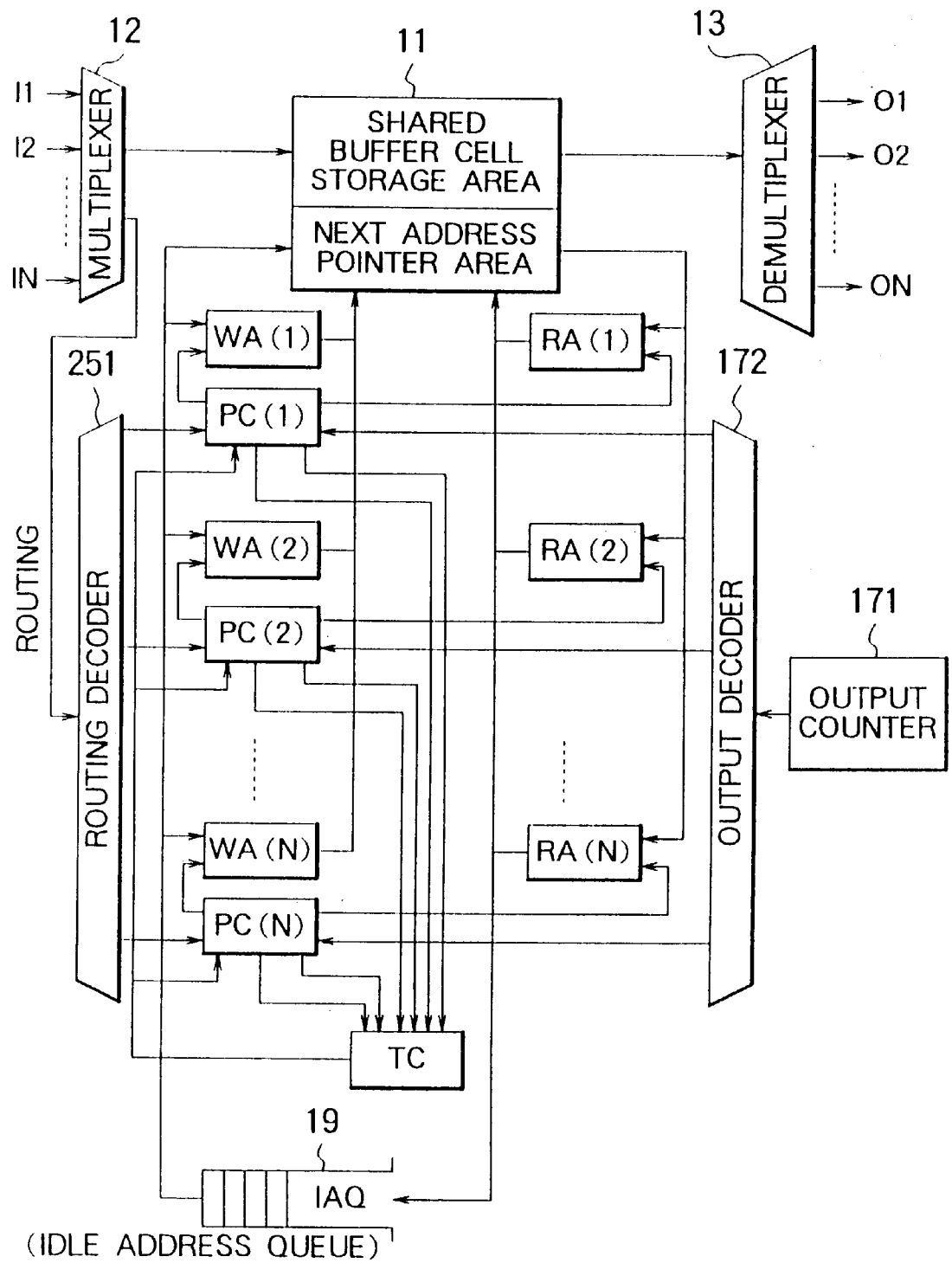
FIG. 4 is a block diagram of an ATM switch device according to a modification of the ATM switch device illustrated in FIG. 2.

Referring to FIG. 4, description will be made about a modification of the ATM switch device illustrated in FIG. 2. In FIG. 4, each of the write-in controller 15, the readout controller 17, and the threshold controller 20 (FIG. 2) is given by components separately arranged from one another, will become clear as the description proceeds.

More specifically, the write-in controller 15 is structured by a routing decoder 251 connected to the multiplexer 12 and first through N-th write-in address registers (depicted by WA(1) to WA(N)) corresponding to the first through the N-th output ports O1 to ON while the readout controller 17 (FIG. 2) is structured by an output counter unit 171, an output decoder 172, and first through N-th readout address registers (depicted by (RA)(1) to (N)) corresponding to the output ports O1 to ON.

In FIG. 4, the threshold controller 20 is structured by first through N-th port cell counter unit units PC(1) to PC(N) given the first through the N-th minimum guaranteed values Pmin1 to PminN and a total cell counter unit TC given the initial value IV which is equal to the total sum of the first through the N-th minimum guaranteed values Pmin1 to PminN. The port cell counter units PC(1) to PC(N) and the total cell counter unit TC may be called a port threshold circuit and a total threshold circuit both of which can carry out control operations in a manner to be described later. This shows that each of the port cell counter units PC(1) to PC(N) and the total cell counter unit TC is formed by a combination of a counter unit and a control circuit.

Like in FIG. 2, an idle address queue (IAQ) buffer 19 is included in the illustrated ATM switch device.

As shown in FIG. 4, the first through the N-th port cell counter units PC(1) to PC(N) are connected to both the routing decoder 251 and the output decoder 172 and count the numbers of the cells by carrying out increment or decrement operations in a manner to be described later in detail. When the count in each of the first through the N-th port cell counter units PC(1) to PC(N) is greater than each of the first through the N-th maximum values Pmax1 to PmaxN determined in the respective counter units PC(1) to PC(N), traffic congestion is indicated from each of the port cell counter units PC(1) to PC(N) to carry out cell discard. Similarly, the cell discard is also carried out when the number of the cells exceeds the total maximum value Tmax of the total cell counter unit TC, namely, the memory capacity of the shared buffer 11.

When each of the port cell counter units PC(1) to PC(N) is designated or selected by either the routing decoder 251 or the output decoder 172, a corresponding one of the write-in address registers WA(1) to WA(N) or the readout address registers RA(1) to RA(N) is operated to supply the address stored therein to the shared buffer 11.

The total cell counter unit TC is given the initial value IV which is equal to the total sum of the first through the N-th minimum guaranteed values like in FIG. 3. The total cell counter unit TC is counted up only when each of the first through the N-th minimum guaranteed values Pmin1 to PminN becomes greater than each of the first through the N-th minimum guaranteed values Pmin1 to PminN set into the first through the N-th minimum guaranteed values, like in FIG. 1.

The other operations of the ATM switch device are similar to the conventional ATM switch device described in Reference and will not be described any longer.

Figure 5:
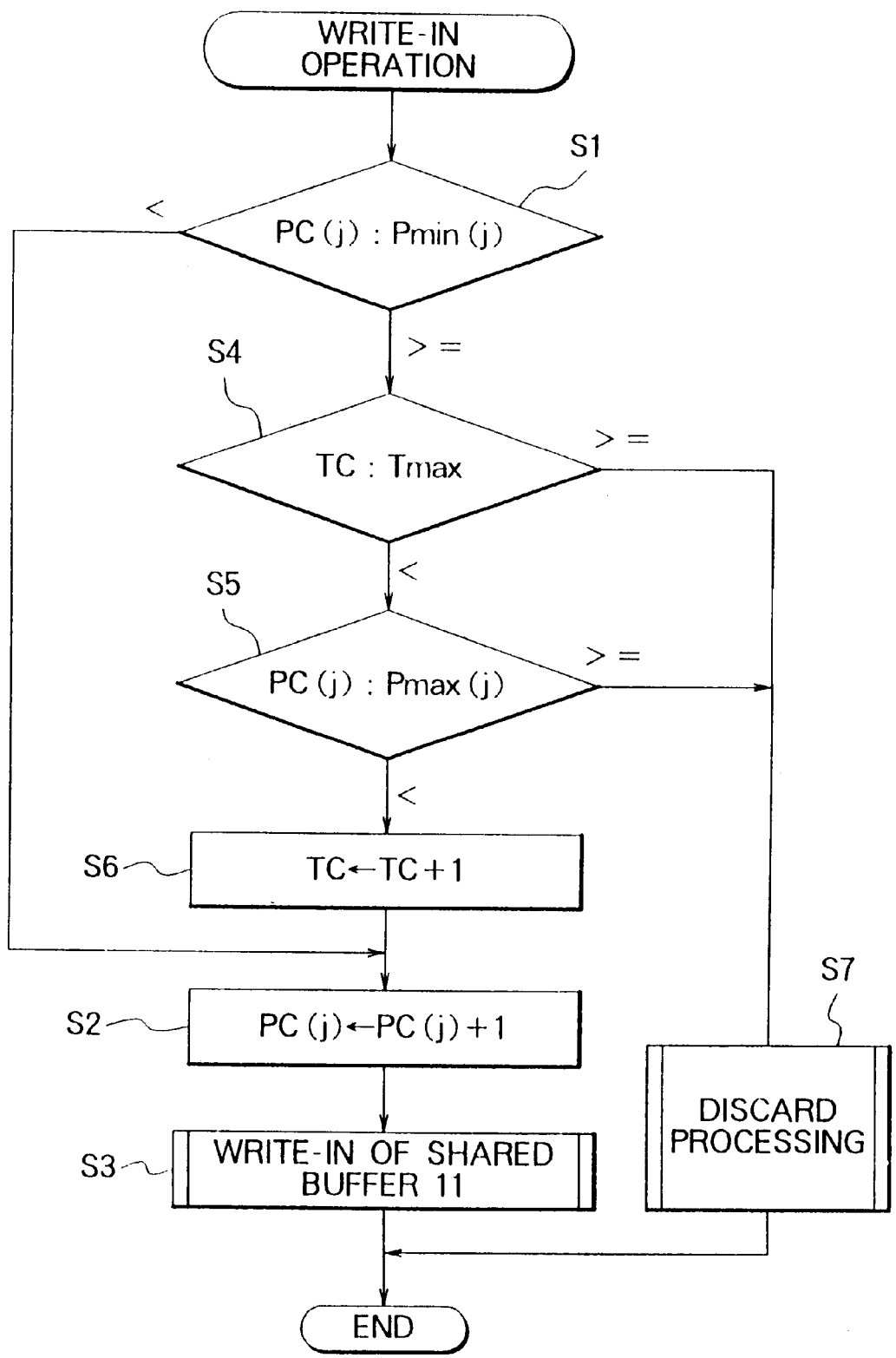
FIG. 5 shows a flow chart for use in describing a write-in operation carried out in the ATM switch device illustrated in FIG. 4.
Figure 6:
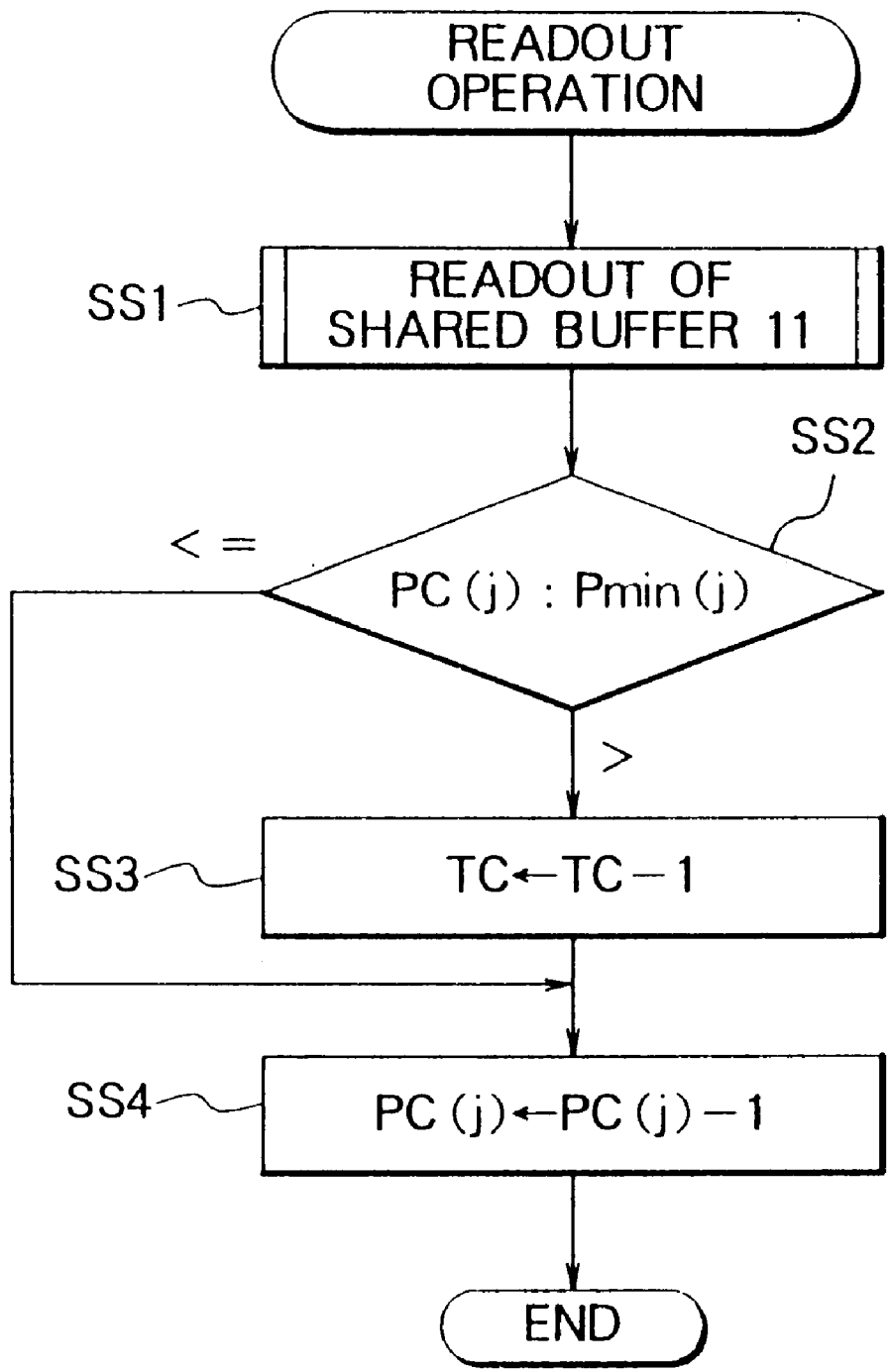
FIG. 6 shows a flow chart for use in describing a readout operation carried out in the ATM switch device illustrated in FIG. 4.

Referring to FIGS. 5 and 6 together with FIG. 4, the operations of the port cell counter units PC(1) to PC(N) and the total cell counter unit TC will be described for a better understanding of this invention.

In FIGS. 5 and 6, it is assumed that the total cell counter unit TC is given the initial value IV which is equal to the total sum of the first through the N-th minimum guaranteed values Pmin1 to PminN assigned to the port cell counter units PC(1) to PC(N).

The write-in operation and the readout operation are carried out in connection with the shared buffer 11 on the assumption that a j-th one (PC(j)) of the port cell counter units PC(1) to PC(N) is indicated and that is given a j-th one of the minimum guaranteed values depicted by Pmin(j). Herein, it is to be noted that the write-in operation and the readout operation are conducted under control of the control circuits included in the port cell counter units PC(1) to PC(N).

For brevity of illustration, the contents of the port cell counter unit PC(j) and the total cell counter unit TC are also shown by (PC(j)) and (TC) in parentheses, respectively.

The write-in operation is executed in accordance with a procedure which is illustrated in FIG. 5. When the write-in operation is started, the count (PC(j)) of the port cell counter unit PC(j) is compared with the minimum guaranteed value Pmin(j) at a first step S1 by the port cell counter unit PC(j). In other words, the port cell counter unit PC(j) judges at the first step S1 whether or not the count (PC(j)) is equal to or greater than the minimum guaranteed value Pmin(j). When the count (PC(j)) is smaller than Pmin(j), the first step S1 is jumped to a second step S2 at which the count (PC(j)) is counted up by one. Subseqently, an input cell is written into the shared buffer 11 at a third step S3.

On the other hand, when the count (PC(j)) is judged at the first step S1 to be equal to or greater than the minimum guaranteed value Pmin(j), the content or the total count (TC) of the total cell counter unit TC is compared with the maximum value Tmax at a fourth step S4. When the total count (TC) of the total cell counter unit TC is smaller than the maximum value Tmax, the fourth step S4 is followed by a fifth step S5 to compare the count (PC(j)) with a maximum value Pmax(j) of the M-th port cell counter unit PC(j).

When the count (PC(j)) is smaller than the maximum value Pmax(j), the fifth step S5 is succeeded by a sixth step S6 at which the total cell counter unit TC is counted up by one. As a result, the content of the total cell counter unit (TC) is changed to TC+1, as shown in FIG. 5. Thereafter, the sixth step S6 is followed by the second step S2 at which the port cell counter unit PC(j) is counted up by one, as described before. After the second step S2, the third step S3 is executed to write an input cell into the shared buffer 11.

At the fourth step S4, let the total count (TC) be equal to or greater than the maximum total value Tmax. In this event, the fourth step S4 is followed by a seventh step S7 at which an input cell is discarded, namely, discard processing is carried out. More specifically, the write-in operation is carried out without cell discard when the count (PC(j)) of the j-th port cell counter unit unit PC(j) is not smaller than PCmin(j) and is smaller than Pmax(j) as long as total cell count (TC) does not exceed Tmax.

With reference to FIG. 6, description will be made about the readout operation of an output cell which is executed in the ATM switch device illustrated in FIG. 4. At a first step SS1, an output cell is read out of the shared buffer 11. Thereafter, the count (PC(j)) of the j-th port cell counter unit PC(j) is compared with the minimum guaranteed value Pmin(j) at a second step SS2. When the count (PC(j)) is judged to be greater than the minimum guaranteed value Pmin(j) as a result of comparison, the second step SS2 is followed by a third step SS3 at which the total cell count (TC) of the total cell counter unit TC is counted down by one.

On the other hand, when the count (PC(j)) is equal to or smaller than the minimum guaranteed value Pmin(j), the second step SS2 is jumped to a fourth step SS4 without the total cell count (TC) kept unchanged in the total cell counter unit TC. At the fourth step SS4, the count (PC(j)) is counted down by one in the j-th port cell counter unit PC(j).

Thus, the above-mentioned write-in and readout operations monitor the minimum guaranteed value Pmin(j) of the port cell counter unit PC(j) and the total cell count (TC) set in the total cell counter unit TC and, as a result, can carry out traffic congestion control.

Figure 7:
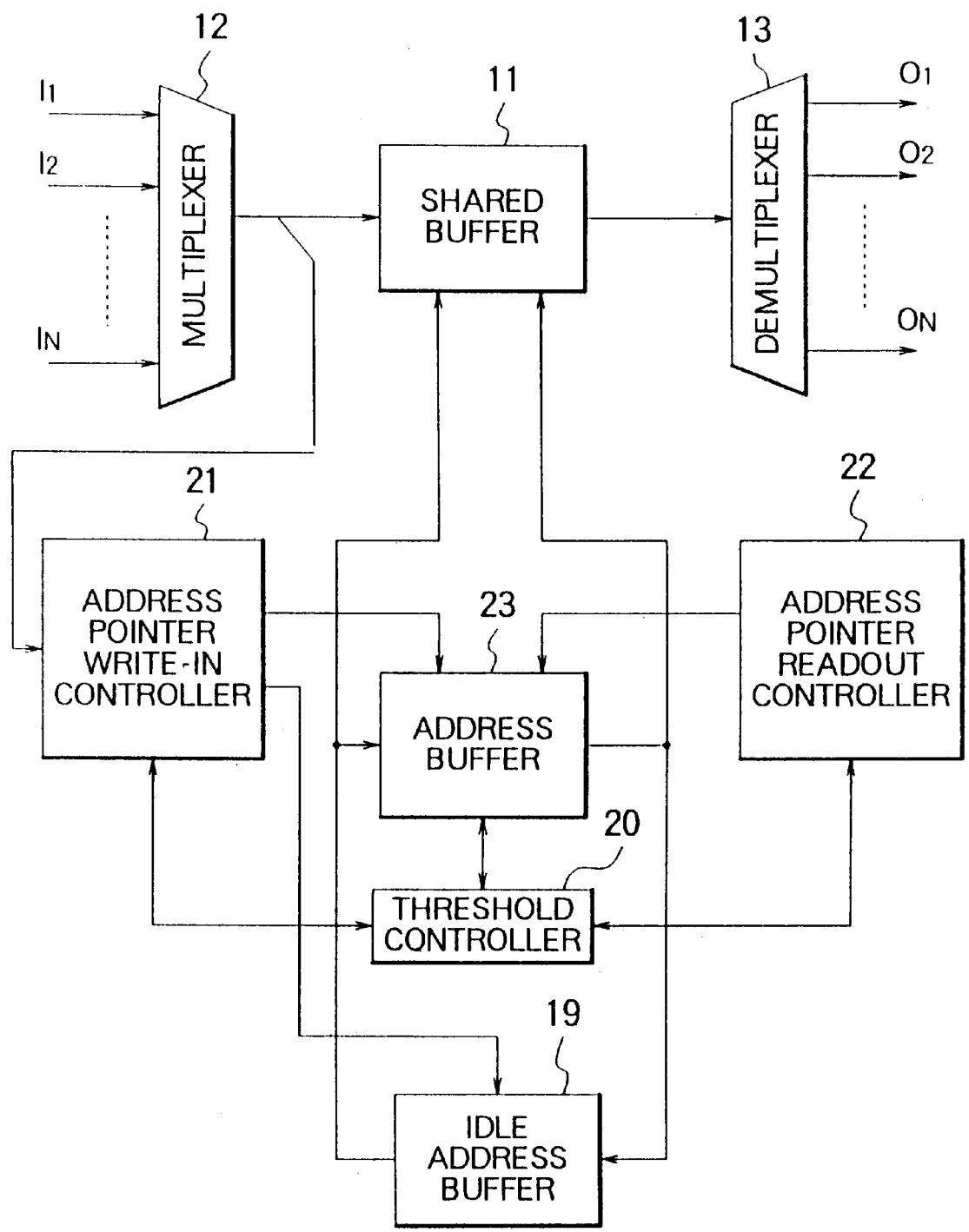
FIG. 7 is a block diagram of an ATM switch device according to another embodiment of this invention structured on the basis of the principle illustrated in FIG. 1.

Referring to FIG. 7, an ATM switch device according to a second embodiment of this invention includes a shared buffer 11, a multiplexer 12, and a demultiplexer 13 like in FIG. 2. The illustrated ATM switch device further includes an address pointer write-in controller 21, an address pointer readout controller 22, and an address buffer 23 which is used in common to both the address pointer write-in controller 21 and the address pointer readout controller 22.

The illustrated address pointer write-in controller 21 is connected to the multiplexer 12, the address buffer 23, the threshold controller 20, and the idle address buffer 19 to indicate a next address of the shared buffer as a write-in pointer while the address pointer readout controller 22 is connected to the address buffer 23 and the threshold controller 20. In the illustrated example, the shared buffer 11 has no next address pointer area, differing from that illustrated in FIG. 4.

The address buffer 23 includes a plurality of address registers which are in one-to-one correspondence to the first through the N-th output ports O1 to ON and which are given the minimum guaranteed values Pmin1 to PminN of the respective output ports O1 to ON from the threshold controller 20. The address buffer 23 and the idle address buffer 19 are operated under control of the address pointer write-in controller 21 and the address pointer readout controller 22 to write a cell address and to read the cell address. At any rate, the list structure is formed like in FIG. 2.

On the other hand, the threshold controller 20 is given the initial value IV which is equal to the total sum of the minimum values Pmin1 to PminN. The threshold controller 20 may be similar in structure to that illustrated in FIG. 3.

The illustrated ATM switch device is similar in structure except that the next address pointer is not stored in the shared buffer 11. Each of the addresses is stored in the corresponding address register included in the address buffer 23 and is counted to be compared with Pmin1 to PminN. The total cell count (TC) which is equal to the sum of the counts counted by the respective address register is compared with Tmax in the manner described before. The remaining operation of the ATM switch device shown in FIG. 7 is similar to that of the ATM switch device illustrated in FIG. 2 and will therefore not be described any longer.

The above description has been made on the assumption that only the single cast cell is received by the ATM switch device. However, consideration should be made about receiving a multicast cell which is simultaneously delivered to a plurality of output ports. Herein, the number of the output ports to which the multicast cell is simultaneously delivered may be referred to as a multicast number, namely, the multicast number and may be represented by NC.

It is to be noted that the multicast cell may use a single area alone in a shared buffer like the single cast cell. In other words, the multicast cell may occupy the single area like a single cell. This means that areas which are equal to the multicast number NC may not be prepared in the shared buffer 11. Rather, the areas of (NC−1) are preferably kept unused in the shared buffer 11 and may be called unused areas. Under the circumstances, the unused areas of (NC−1) may be used to store any other cells which are equal in number to (NC−1). Stated otherwise, the areas for (NC−1) cells may be released on reception of the multicast cell of the multicast number NC.

Herein, it is assumed that such a multicast cell is processed like the single cast cells of NC in number. In this event, a shared buffer must have a plurality of areas equal in number to NC.

On the other hand, when the minimum guaranteed values are determined for the respective output ports as the ATM switch device according to this invention, minimum guaranteed areas which correspond to the minimum guaranteed values are reserved for the respective output ports in the shared buffer, as already mentioned before.

Taking the above into account, it may be readily understood that the multicast cell may be stored only in one of the minimum guaranteed areas and may not be always stored in the remaining minimum guaranteed areas except the one area. This shows that the remaining minimum guaranteed areas of (NC−1) in number may be released for any other cells and such release of the remaining minimum guaranteed areas brings about effective use of the shared buffer.

Thus, when the multicast cell of the multicast number NC is received by the ATM switch device, the shared buffer can be effectively utilized if the areas of (NC−1) in number can be released from the minimum guaranteed areas for the output ports.

Heretofore, proposals have been made about various kinds of the ATM switch devices which can deal with multicast cells. Herein, the following description will be directed to the case where this invention is applied to an ATM switch device which processes the multicast cell by copying an address pointer and which will be described as prior art in Japanese Patent Unexamined Publication No. Hei 5-276189, namely, 276189/1993.

Figure 8:
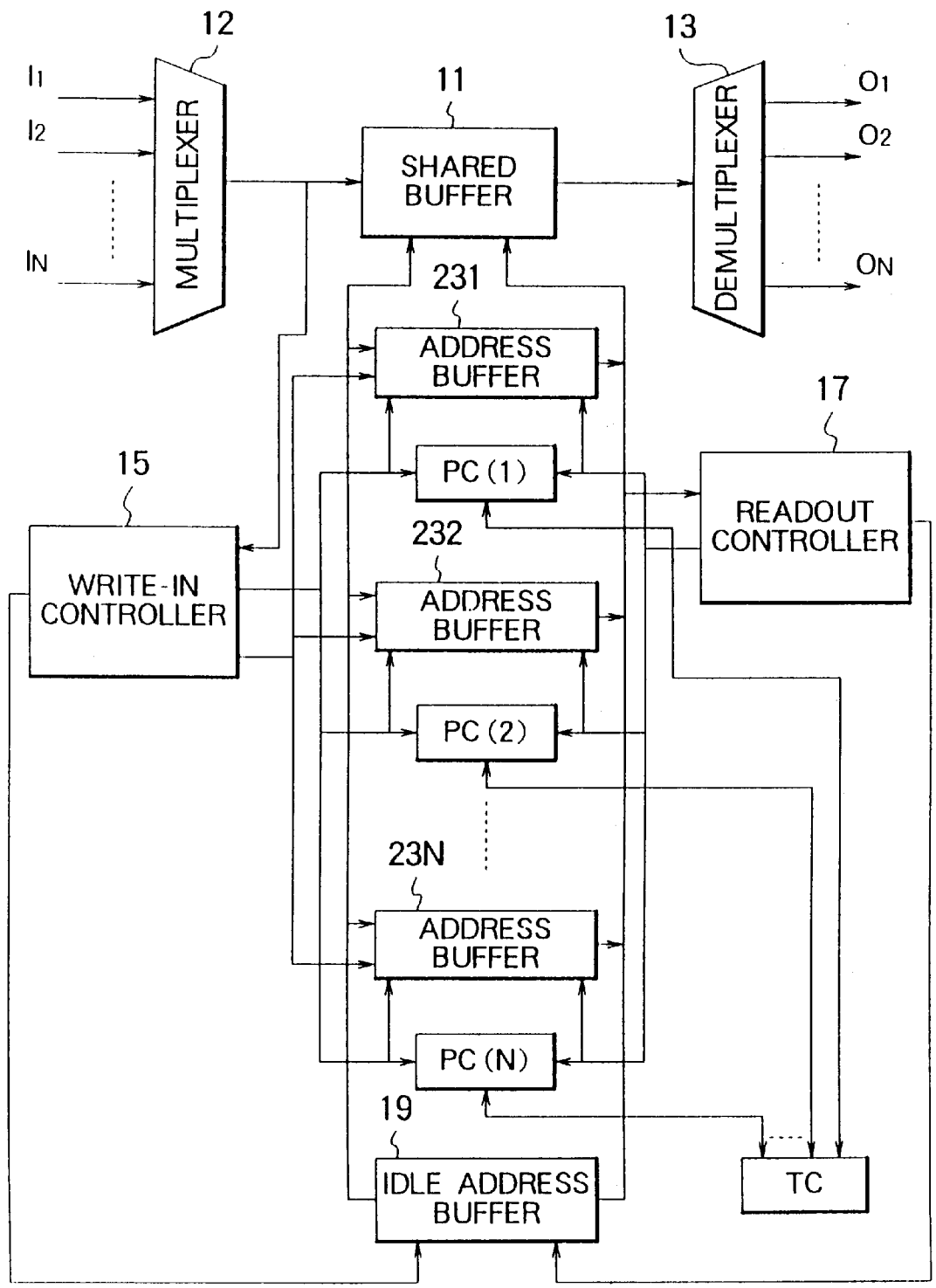
FIG. 8 is a block diagram of an ATM switch device according to another embodiment of this invention.
Figure 9:
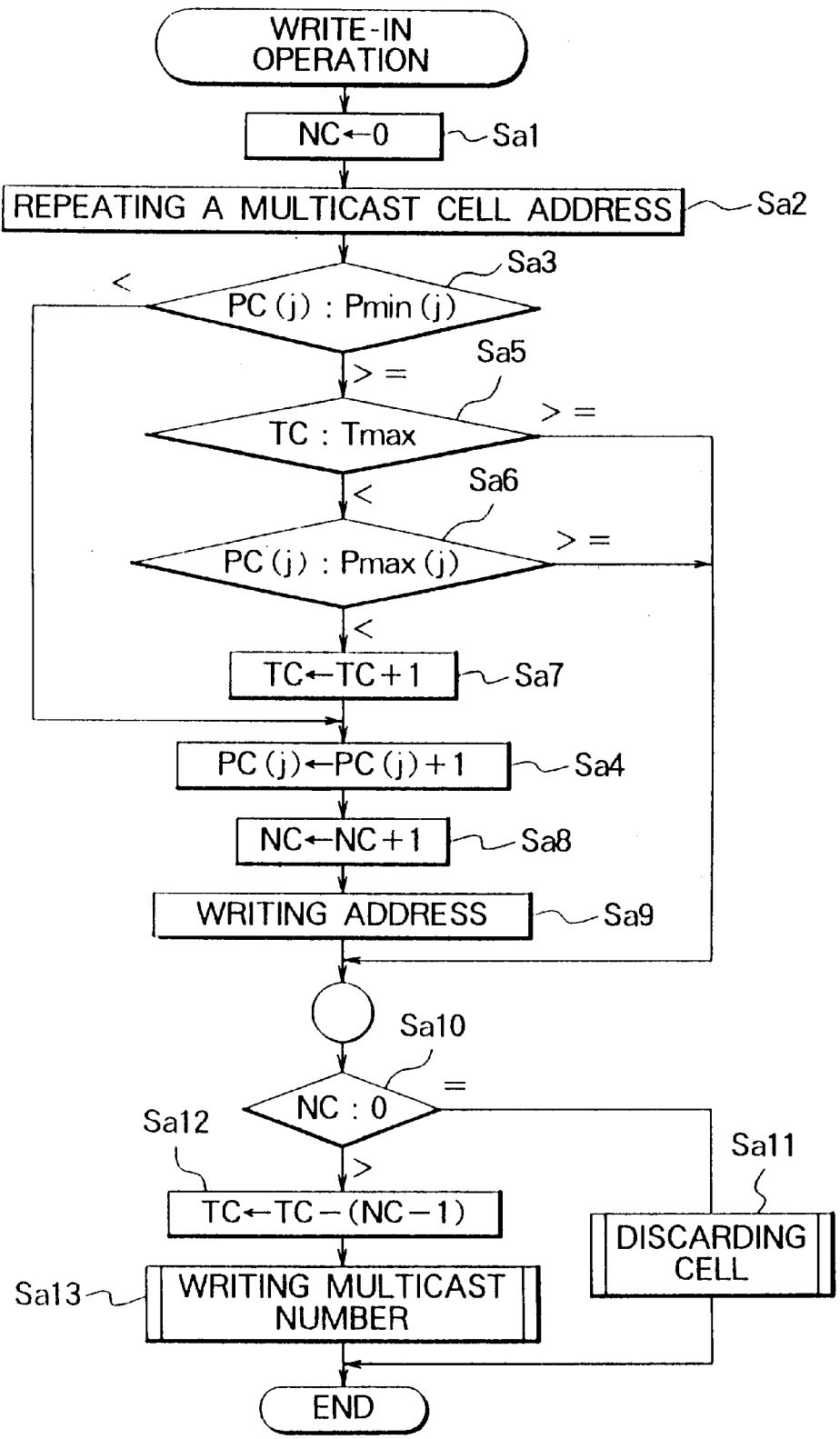
FIG. 9 is a flow chart for use in describing a write-in operation of the ATM switch device illustrated in FIG. 8.
Figure 10:
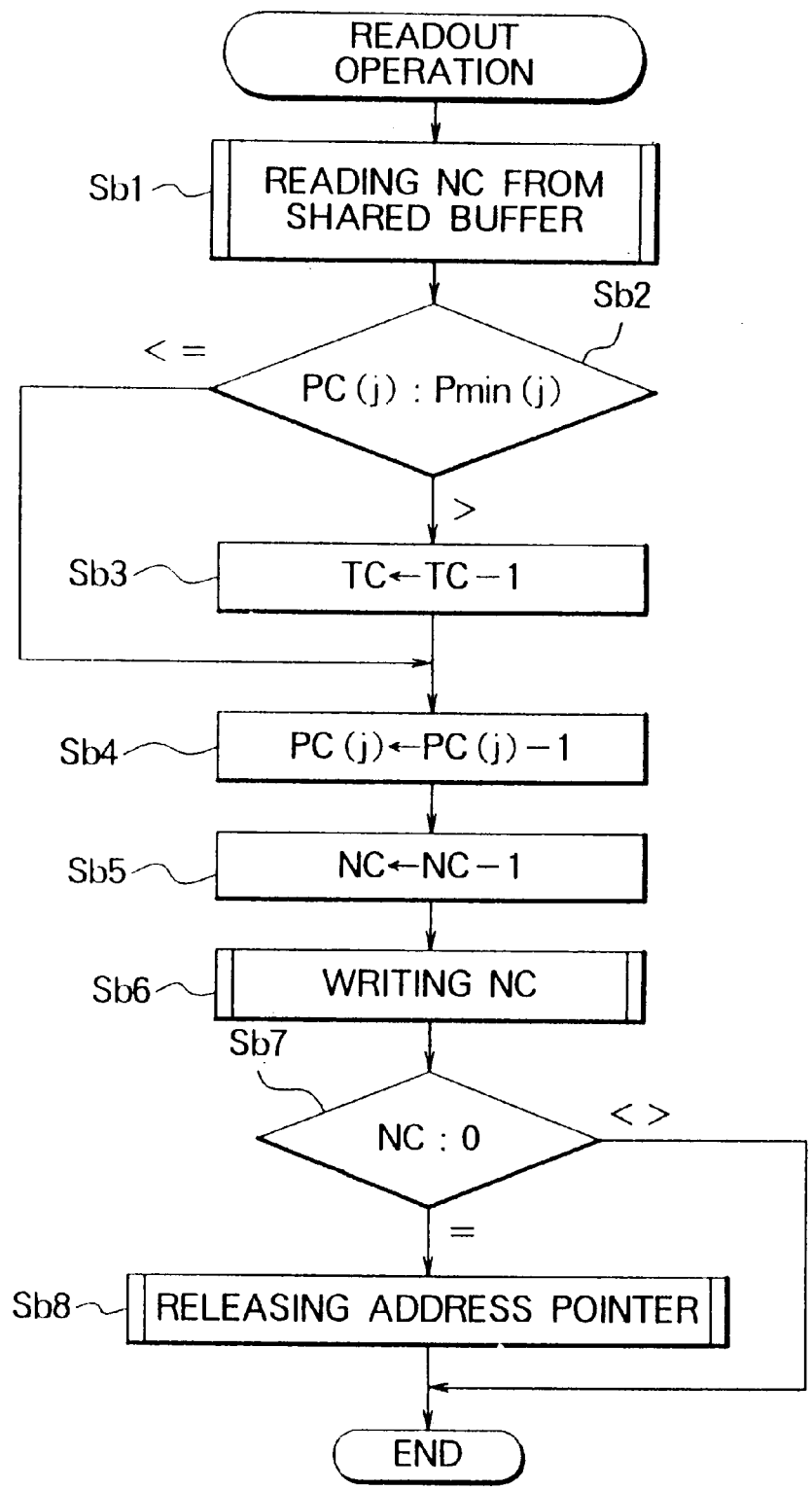
FIG. 10 is a flow chart for use in describing a readout operation of the ATM switch device illustrated in FIG. 8.

Referring to FIGS. 8, 9, and 10, an ATM switch device according to a third embodiment of this invention has first through N-th input ports I1 to IN and first through N-th output ports O1 to ON and includes a shared buffer 11, a multiplexer 12, a demultiplexer 13, a write-in controller 15, a readout controller 17, and an idle address buffer 19 like in FIG. 2. In addition, the illustrated ATM switch device further includes first through N-th address buffers 231 to 23N arranged for the respective output ports O1 to ON, first through N-th port cell counter units PC(1) to PC(N) connected to the respective address buffers 231 to 23N to count contents of the first through the N-th address buffers 231 to 23N, and a total cell counter unit TC similar to that illustrated in FIG. 3.

A combination of the port cell counter units PC(1) to PC(N) and the total cell counter unit TC is substantially equivalent to the threshold controller 20 illustrated in FIG. 3 and may be collectively referred to as the threshold controller 20.

Herein, it is assumed that a multicast cell controller is included in the threshold controller 20 in the illustrated example, although the multicast controller may be included in the write-in controller 15. Practically, the multicast cell controller is implemented by a software program and is not illustrated in FIG. 8.

In the example illustrated, it is also surmised that the total cell counter unit TC is given a total cell minimum guaranteed value which is equal to a total sum of the first through the N-th minimum guaranteed values Pmin1 to PminN while the shared buffer 11 reserves minimum guaranteed areas which corresponds to the total cell minimum guaranteed value.

Referring to FIG. 9 together with FIG. 8, write-in operation of a multicast cell which is carried out in the multicast cell controller, will be described hereinunder. The multicast cell is given a multicast cell number or address of the shared buffer 11 which corresponds to the routing information sent to the write-in controller 15.

In FIG. 9, the write-in operation is started and entered into a first step Sa1 at which a multicast cell counter unit is cleared when a multicast cell is received as an input cell. The multicast cell is to be stored in a multicast cell address in a known manner. In the illustrated example, the multicast cell counter unit is operated in the multicast controller included in the threshold controller 20. In FIG. 9, a count or a content of the multicast cell counter unit is represented by NC and is put into zero at the first step Sa1.

Subsequently, the multicast cell address is repeatedly copied at a second step Sa2 in the multicast controller by a multicast number which may be also depicted by (NC). As a result, the multicast cell address in the shared buffer 11 is stored in selected ones of the address buffers 231 to 23N that are equal in number to the multicast number. Thus, each of the selected address buffers is loaded with the multicast cell address.

In this situation, the second step Sa2 is followed by a third step Sa3 at which a count (PC(j)) of the j-th port cell counter unit PC(j) is compared with a minimum guaranteed value Pmin(j) set into the j-th port cell counter unit PC(j). As a result of comparison, when the count (PC(j)) is smaller than the minimum guaranteed value Pmin(j) set in the j-th port cell counter unit PC(j), the third step Sa3 is jumped to a fourth step Sa4 at which the count (PC(j)) is counted up by one in the j-th port cell counter unit PC(j).

On the other hand, the count (PC(j)) is equal to or greater than the minimum guaranteed value Pmin(j), the third step Sa3 proceeds to a fifth step Sa5 at which the total count (TC) is compared with a maximum total count Tmax. When the total count (TC) is smaller than the maximum total count Tmax, the fifth step Sa5 is followed by a sixth step Sa6 to compare the count (PC(j)) of the j-th port cell counter unit PC(j) with a maximum port value Pmax(j) determined for the j-th port cell counter unit PC(j).

If the count (PC(j)) is smaller than the maximum port value Pmax(j), a seventh step Sa7 is carried out after the sixth step Sa6 to increment the total count (TC) by one. Then, the port cell counter unit PC(j) is also incremented by one at the fourth step Sa4 in the above-mentioned manner.

The fourth step Sa4 is followed by an eighth step Sa8 at which the multicast cell counter unit is counted up by one and which is succeeded by a ninth step Sa9 at which the address pointer is written into the one selected address register 23j and which is followed by a tenth step Sa10.

At the tenth step Sa10, it is judged whether or not the content (NC) of the multicast cell counter unit is equal to zero. When the content (NC) of the multicast cell counter unit NC is equal to zero, the tenth step Sa10 is followed at an eleventh step Sa11 at which the input cell in question is discarded. On the other hand, when the content (NC) of the multicast cell counter unit NC is greater than zero, the tenth step Sa10 is succeeded by a twelfth step Sa12 to calculate (TC−(NC−1)) and to renew or update the total cell counter unit TC. This shows that a value which is obtained by subtracting unity from the multicast number NC is further subtracted from the total cell number or the content (TC) of the total cell counter unit TC. In other words, the multicast cell is counted by the total cell counter unit TC line a single cast cell so as to release the minimum guaranteed areas of (NC−1). With this structure, control operation can be carried out such that the minimum guaranteed areas arranged in the shared buffer 11 is not affected by the multicast number NC of the multicast cell.

Thereafter, the multicast number NC is written into the shared buffer 11 at a thirteenth step Sa13. Thus, the write-in operation of the multicast cell into the shared buffer 11 is finished.

Referring to FIG. 10, description will be made about the readout operation hereinunder. When the readout operation is started, the multicast number NC and the multicast cell are read out of the shared buffer 11 at a first step Sb1. Subsequently, the count (PC(j)) of the port cell counter unit PC(j) is compared at a second step Sb2 with the minimum guaranteed value Pmin(j) determined for the j-th output port Oj. When the count (PC(j)) is greater than the Pmin(j), the second step Sb2 is followed by a third step Sb3 at which unity is subtracted from the content (TC) of the total cell counter unit TC. Thereafter, the third step Sb3 proceeds to a fourth step Sb4.

On the other hand, when the count (PC(j)) is equal to or smaller than the Pmin(j), the second step Sb2 is jumped to a fourth step Sb4 at which the count (PC(j)) of the port cell counter unit PC(j) is counted down by one. Subsequently, the multicast number NC is also reduced by one to obtain a renewed multicast number NC at a fifth step Sb5. The renewed multicast number NC is written into the shared buffer 11 at a sixth step Sb6.

The sixth step Sb6 proceeds to a seventh step Sb7 at which the multicast number NC is compared with zero. When the multicast number NC is equal to zero, an address pointer is released at an eighth step Sb8. Otherwise, the readout operation is finished.

Figure 11:
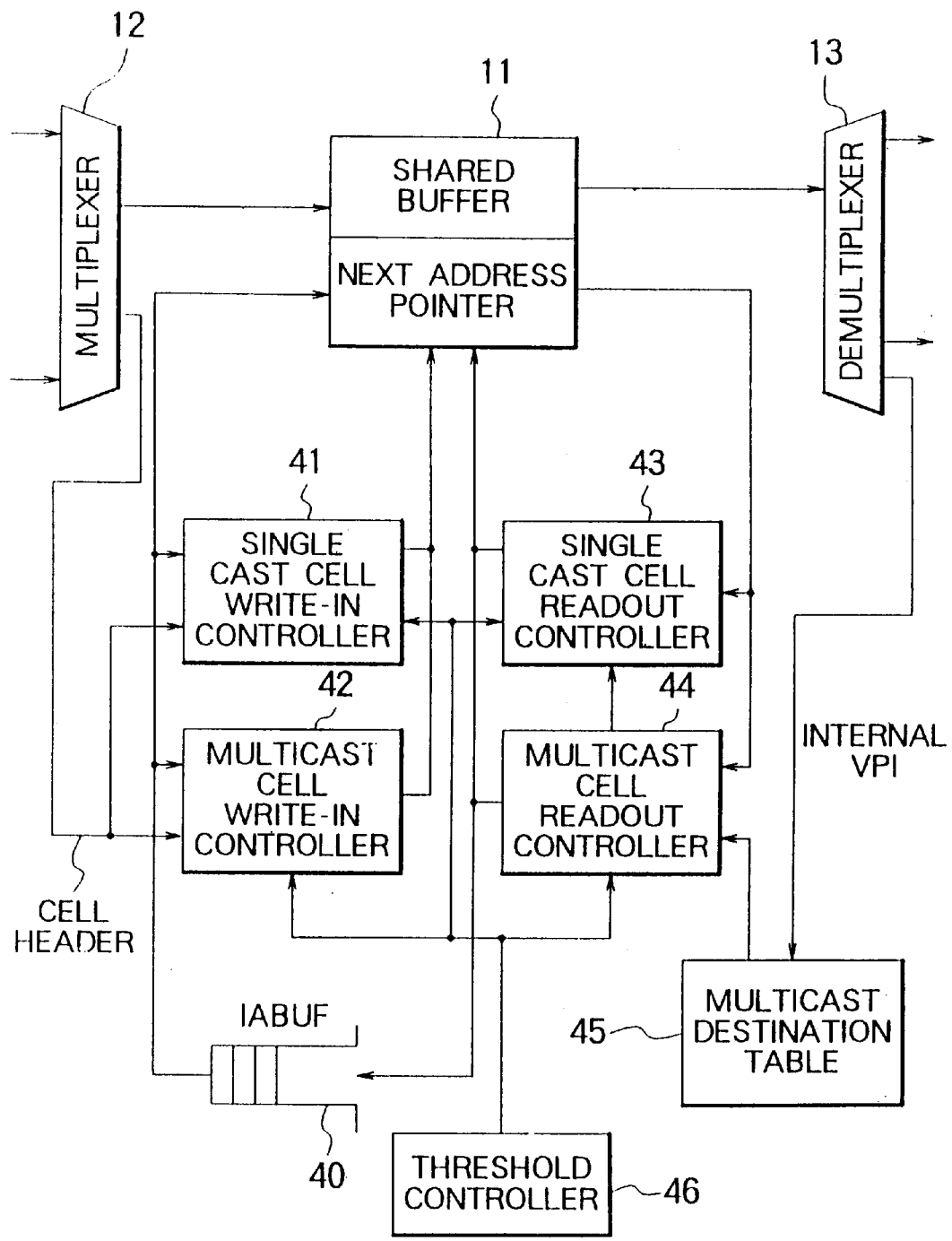
FIG. 11 is a block diagram of an ATM switch device according to another embodiment of this invention.

The write-in and the readout operations shown in FIGS. 10 and 11 might be carried out by a multicast controller included in the write-in controller 15.

Referring to FIG. 11, an ATM switch device according to a further embodiment of this invention will be described which can deal with a multicast cell. The illustrated ATM switch device includes a multiplexer 12, a demultiplexer 13, a common or shared buffer 11, and an idle address buffer 40 like in the other embodiments. In addition, the ATM switch device further includes a single cast cell write-in controller 41, a multicast cell write-in controller 42, a single cast cell readout controller 43, a multicast cell readout controller 44, a multicast destination table 45, and a threshold controller 46.

When an input cell is received through the multiplexer 12, a cell header of the input cell is delivered to the single cast cell write-in controller 41 and the multicast cell write-in controller 42 so as to operate either one of the write-in controllers 41 and 42 and to indicate an address for the input cell in response to the cell header. As a result, the input cell is written into the address of the shared buffer 11 indicated by either one of the write-in controllers 41 and 42. At this time, a next write-in address is read out of the idle address buffer 40 and is stored in the shared buffer 11 as a next address pointer. Thus, a list structure of cells is formed. In the illustrated example, a list structure for single cast cells and a list structure for multicast cells are individually formed and independently managed by the write-in controllers 41 and 42.

When a single cast cell is read out of the shared buffer 11, the single cast cell readout controller 43 supplies the shared buffer 11 with an address which corresponds to an output port and simultaneously reads a next address pointer also from the idle address buffer 40. Thus, a next readout address is kept as the next address pointer by the single cast cell readout controller 43. On the other hand, the readout address from which a cell is already read is returned back to the idle address buffer 40 and an area pointed out by the readout address is released, under control of the single cast cell readout controller 43.

When a multicast cell is read out of the shared buffer 11, the multicast cell readout controller 44 is operated to supply an internal VPI (virtual path identifier) of the multicast cell to the multicast destination table 45. The multicast cell readout controller 44 accesses the multicast destination table 45 to determine destinations of the multicast cell and to repeatedly send the multicast cell to the output ports determined by the multicast destination table 44. In this event, it is assumed that the multicast cell may be repeatedly copied by the multicast number on the output port sides in the manner described in Japanese Patent Unexamined Publication No. Hei 5-276189, namely, 276189/1993.

When the multicast cell is completely copied for all the output ports determined by the table 44, the multicast cell readout controller 44 releases the area specified by the address in which the multicast cell was stored. The address is stored as an idle address in the idle address buffer 40.

As shown in FIG. 11, the threshold controller 46 included in the ATM switch device is similar in operation to that mentioned in conjunction with FIGS. 8 to 10 except an operation which is carried out on reception of the multicast cell.

As mentioned before, it is to be noted that the multicast cell is read out of the shared buffer 11 and is repeatedly copied on the output side of the ATM switch device to be delivered to a plurality of the output ports. Alternatively, the multicast cell may be repeatedly copied by the multicast number NC on the input port side in the manner mentioned in Japanese Patent Unexamined Publication No. Hei 6-120974, namely, 120974/1994. In addition, the address which is assigned to the multicast cell may be repeatedly copied by the multicast number NC in the manner described in Japanese Patent Unexamined Publication No. Hei 6-62041, namely, 62041/1994.

At any rate, the minimum guaranteed values Pmin and the total cell value are managed or administrated in a manner similar to that illustrated in conjunction with the other embodiments.

More specifically, when the multicast cell is received as an input cell, the multicast cell is recognized as a single cell and the total cell counter unit TC to which an initial value IV is determined is counted up only by one. This means that areas indicated by the total cell counter unit TC are released by ((multicast number NC)−1). By this release, the minimum guaranteed areas in the shared buffer 11 can be reduced to (TC−(NC−1)).

With this structure, the multicast cell is not stored in all of buffers or all areas determined for the output ports to which the multicast cell is to be delivered. From this fact, it may be understood that the list structure for the multicast and the list for the single cast are independently administrated in the illustrated embodiment.

As stated before, the shared buffer 11 and the total cell counter unit TC process the multicast cell as a single cell in the above-mentioned example. Accordingly, a minimum guaranteed value for the multicast cell may be controlled in a manner similar to that used to control only the single cast cell.

For example, if the cell and the port cell counter units PC illustrated in FIGS. 2 to 6 are regarded as the multicast cell and the multicast cell buffer, respectively, the processing operation described in conjunction with FIGS. 2 through 6 may be applicable to the multicast cell processing to control the minimum guaranteed values. In this event, the multicast cell buffer substituted for the port cell counter units PC may have a function of copying the multicast cell or a multicast cell address on readout operation of the multicast cell.

More particularly, a multicast cell counter unit which is exclusively used by the multicast cell may be included in the threshold controller 46 shown in FIG. 11 in addition to the port cell counter units PC which correspond to the output ports. In this event, the total cell counter unit TC may be also included in the threshold controller 46 and may be controlled so that the content of the total cell counter unit TC becomes equal to a total sum of the counts in the respective port cell counter units PC and the content of the multicast cell counter unit.

According to this control operation, the minimum guaranteed value of the multicast cell can be readily kept without any complex control, such as the release operation of the areas (NC−1). Furthermore, each time when the multicast cell is delivered to a related output port, unity is subtracted from the total cell counter unit TC.

Figure 12:
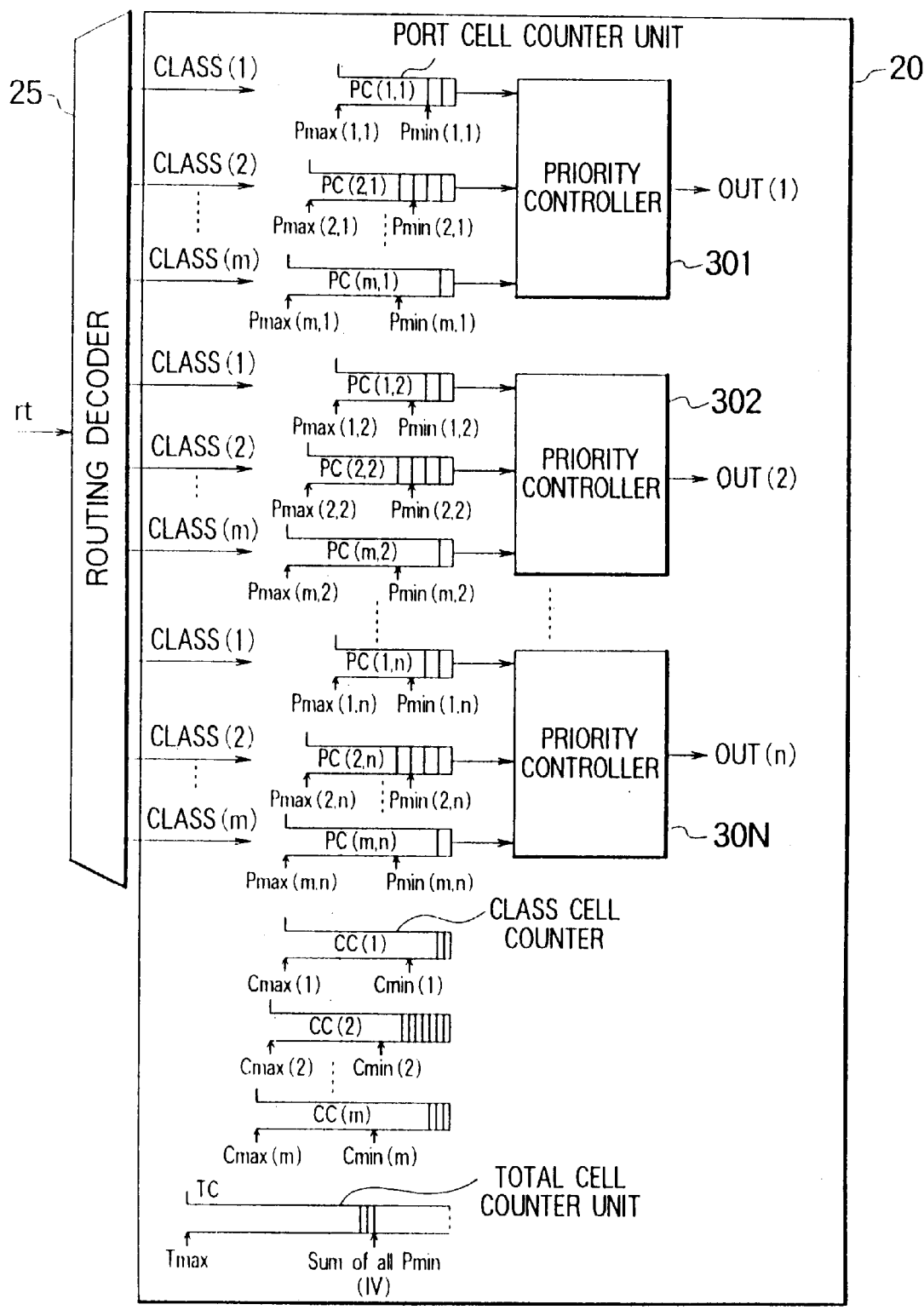
FIG. 12 is a block diagram of an ATM switch device according to a further embodiment of this invention.

Referring to FIG. 12, description will be made about the case where this invention is applied to an ATM switch device which can distinguish service classes determined by CBR, ABR, VBR, and UBR services from one another. Taking this into consideration, cells are classified into four service classes on the basis of factors indicative of cell traffic states and a transfer quality of cells, namely, a quality of services. Inasmuch as each service class can be distinguished from the others by the use of the technique disclosed in Japanese Patent Application No. Hei 7-44463, namely, 44463/1995, a method of identifying the service classes will not be described in the instant specification. Herein, it suffices to understand that a peak rate or a transmission rate of cells is invariable in the CBR while the peak rate of cells is variable in the ABR and that cells of the UBR may be transmitted at a low priority.

In addition, the description will be made about only the single cast cell. However, it is possible to process the multicast cell in the manner mentioned with reference to FIGS. 8 to 10 and to effectively use the shared buffer 11 by releasing the minimum guaranteed areas in the before mentioned manner.

The ATM switch device may be similar in structure to that illustrated in FIG. 2 or 4 except for a structure of a threshold controller 20.

Under the circumstances, the threshold controller 20 alone is illustrated in FIG. 12 as the ATM switch device. In FIG. 12, it is assumed that first through m-th service classes (1) to (m) are set as service classes and are distinguished along with the output ports from one another by the use of the routing information port.

The illustrated threshold controller 20 has first through m-th port cell counter units PC(1,1) to PC(m,1) for a first one (O1) of the output ports. From this fact, it is readily understood that the first through m-th port cell counter units PC(1,1) to PC(m,1) correspond to the first through the m-th service classes (1) to (m), respectively. Likewise, the threshold controller 20 is equipped with first through m-th port cell counter units PC(1,2) to PC (m,2) for a second one (O2) of the output ports in correspondence to the first through the m-th service classes (1) to (m). This shows that the first through the m-th port cell counter units PC(1,n) to PC(m,n) for the output port ON are also prepared in the threshold controller 20 and correspond to the first through the m-th service classes (1) to (m).

Like in the other embodiments, each of the port cell counter units PC(1,1) to PC(m,n) has a maximum count value Pmax(1,1) to Pmax(m,n) and a minimum guaranteed value Pmin(1,1) to Pmin(m,n).

In the illustrated example, first through m-th class cell counter units CC(1) to CC(m) are included in the threshold controller 20 to count total class cells for the first through the m-th service classes, respectively, and are given first through m-th class minimum guaranteed values Cmin(1) to Cmin(m) for the respective service classes.

In this event, the first through m-th class minimum guaranteed values Cmin(1) to Cmin(m) may be determined independently of the minimum guaranteed values Pmin(1,1) to Pmin(1,n); P(2,1) to Pmin(2,n); Pmin(m,1) to Pmin(m,n) determined at every one of the service classes (1) to (m). In the illustrated example, when the class minimum guaranteed values Cmin(1) to Cmin(m) are exceeded, the shared buffer 11 is used regardless of the classes and the ports.

Furthermore, the threshold controller 20 illustrated in FIG. 12 includes a total cell counter unit TC which is given a total minimum value (TC) which is equal to a total sum of the class minimum guaranteed values Cmin(1) to Cmin(m), the class minimum guaranteed values Pmin(1,1) to Pmin(m,1), Pmin(1,2) to Pmin(m,2), . . . , and Pmin(1,n) to Pmin (m,n).

In operation, when an input cell is received to be delivered to each output port O1 to ON, the output port and the service class which corresponds to the input port are identified by the routing information port in the routing decoder 25. As a result, count signals are delivered to the port cell counter units which correspond to the identified output port and service class and which are counted up by one each time at reception of the count signals. This operation is carried out at every one of the port cell counter units PC.

When a certain port cell counter unit which belongs to a certain service class exceeds the minimum guaranteed value Pmin, the corresponding class cell counter unit CC is counted up by one. Similar operation is made at every one of the class cell counter units CC(1) to CC(m).

Only when the total value of input cells exceeds the total sum of the class minimum guaranteed values Cmin(1) to Cmin(m) determined for the class cell counter units CC(1) to CC(m), the total cell counter unit TC is counted up by one.

On the other hand, when a single output cell is sent through one of the output ports, the corresponding port cell counter unit PC is reduced by one. In this case, if the content of the corresponding port cell counter unit PC exceeds the minimum guaranteed value Pmin, the corresponding class cell counter unit CC is counted down by one. In this situation, if the content of the class cell counter unit exceeds the class minimum guaranteed value Cmin, the total cell counter unit TC is also counted down by one.

In FIG. 12, the threshold controller 20 further comprises priority controllers 301 to 30n which are connected to the port cell counter units PC(1,1) to PC(m,1); PC(1,2)) to PC(m,2); . . . ,; PC(1,n) to PC(m,n) and which correspond to the output ports. The priority controllers 301 to 30n supply output signals Out(1) to (n) along with other output signals of CC and TC to the write-in controller 16 or the readout controller 17, as shown in FIG. 2.

With this structure, when traffic congestion takes place at a certain one of the output ports and the total cell count does not exceed the total cell maximum value, the output cells can be transmitted at the other output ports, if they are not greater in number than the minimum guaranteed values determined for the other output ports. This shows that the output cells are not discarded at the other output ports.

In addition, it is possible to avoid cell discard which might occur due to congestion of different service classes, by determining the class minimum guaranteed values for the respective service classes. In this case, a minimum guaranteed area is kept at every one of the service class and is related to the count or content of the total cell counter unit TC. In each minimum guaranteed area for every service class, a buffer can be used in common to the output ports of the same class. This means that a statistically multiplexing effect can be accomplished among ports.

In the above-mentioned example, grouping is carried out at every one of the classes. However, grouping may be made on the basis of voluntary combination. For example, the classes of the same port may be grouped to collect the classes at each port.

At any rate, it is possible to control the minimum guaranteed values of each group without being affected by congestion of the other groups by setting minimum guaranteed values of each group and by sharing a buffer at every group.

While this invention has thus far been described in conjunction with several embodiments thereof, it will readily be possible for those skilled in the art to put this invention in practice in various other manners.

For example, the ATM switch device controlled by the threshold controller 20 shown in FIG. 12 may adopt either an input buffer scheme of copying input cells or an address copy scheme of copying an input cell address.

Although the above-mentioned embodiment is restricted to the use of the shared buffer, a plurality of buffers may be prepared for the respective input ports or the respective output ports and may be used in common to a plurality of service classes.

At any rate, this invention is advantageous in that cell transfer can be assured within the minimum guaranteed values at output ports other than a specific output port at which traffic congestion takes place by keeping the minimum guaranteed values at the respective output ports and the total guaranteed value of them. The minimum guaranteed values may be determined at the respective classes. In addition, the minimum guaranteed value may be set for the multicast cell.

What is claimed is:

1. An ATM switch device responsive to a plurality of cells for transmitting selected cells to a selected one of output ports after storage of each of the cells, with traffic congestion controlled, said ATM switch device comprising:

port cell counting means which corresponds to the selected one of the output ports and which has a minimum guaranteed number representative of the number of the cells accepted at a minimum for the selected one of the output ports, for successively counting the selected cells in number to form a queue related to the output port;

total cell counting means, which has a total maximum number of the cells accepted at a maximum for the ATM switch, for counting a total number of the cells received by the ATM switch device; and control means for controlling the traffic congestion in the ATM switch device with reference to not only the total maximum number of the cells but also the minimum guaranteed number of the selected cells.

2. An ATM switch device as claimed in claim 1, comprising a plurality of input ports for receiving the cells as input cells and a memory for storing the cells before the cells are transmitted to the output ports.

3. An ATM switch device as claimed in claim 2, wherein the memory comprises a shared buffer shared by the plurality of the output ports.

4. An ATM switch device as claimed in claim 2, wherein the memory comprises input buffers which are located in one-to-one correspondence to the input ports.

5. An ATM switch device as claimed in claim 2, wherein the memory comprises output buffers which are located in one-to-one correspondence to the output ports.

6. An ATM switch device as claimed in claim 1, wherein the port cell counting means has a maximum value determined by a capacity of the port cell counting means;

said control means allowing transmission of the cells through the other output ports except the selected one of the output ports when the selected cells are counted over the maximum value in the port cell counting means and not exceed the total maximum number of the whole of the cells supplied to the ATM switch device.

7. An ATM switch device which comprises a plurality of input ports, a plurality of output ports, and a shared memory shared by the plurality of the output ports and which is operable to receive an ATM cell to send the same as an output cell to a selected output port through the shared buffer, the ATM switch device comprising:

port queue counting means corresponding to the output port portion, for counting the cell in number as a queue arranged at each output port of the output port portion;

means for setting a minimum guaranteed number of the count in each port queue counting means;

detecting means for detecting whether or not the count exceeds the minimum guaranteed number;

total queue counting means which keeps an initial value equal to a total number of each minimum guaranteed numbers, for storing a total queue number by counting a variation of the cell number when the counts of the port queue counting means exceeds the initial value.

8. An ATM device as claimed in claim 7, said ATM device being operable to distinguish a plurality of service classes from one another, further comprising:

means for setting minimum class guaranteed values of the respective output ports at the respective service classes;

the total queue counting means comprising:

means for setting minimum class total guaranteed values of the entirety of the output ports, each of which is determined at every service class; and means for storing a total sum of the minimum class total guaranteed values as said initial value.

9. An ATM device as claimed in claim 7, the ATM device being operable in response to a multicast cell which is simultaneously sent to a plurality of the output ports and which is specified by a multicast number representative of the number of the output ports to be simultaneously transmitted, the shared memory preparing memory areas being smaller in number to the number of the multicast number.

10. An ATM device as claimed in claim 9, wherein the shared memory includes a plurality of minimum guaranteed areas corresponding to the minimum guaranteed values;

the minimum guaranteed areas being released by the number which is equal to a value obtained by subtracting one from the multicast number when the multicast cell is received.

11. An ATM device as claimed in claim 7, the ATM switch device being operable in response to a multicast cell which is simultaneously sent to a plurality of the output ports to be transmitted, the shared memory preparing memory areas being smaller in number to the number of the output ports to be transmitted.

12. An ATM device as claimed in claim 11, wherein the shared buffer includes a plurality of minimum guaranteed areas corresponding to the minimum guaranteed values;

the minimum guaranteed areas being released by the number which is equal to a value obtained by subtracting one from the number of the plurality of the output ports to which the multicast cell simultaneously sent when the multicast cell is received.

13. An ATM device as claimed in claim 7, further comprising:

a single cast cell counter unit for counting only a single cast cell in the ATM cell; and a multicast cell counter unit for counting only a multicast cell in the ATM cell.

14. A method of controlling an ATM switch device which comprises a plurality of output ports and a shared memory which is shared by the plurality of the output ports, comprising the steps of:

monitoring a minimum guaranteed value representative of the number of the cells accepted at a minimum at every one of the output ports;

monitoring a total number of cells received by the ATM switch device; and controlling congestion of each output port with reference to not only the total number of the cells but to the minimum guaranteed value of each output port.

15. A method as claimed in claim 14, further comprising the step of:

monitoring a total number of the ATM cells which is equal to a sum of the minimum guaranteed values of the whole output ports;

controlling congestion of each output port with reference to the total number of the ATM cells.

16. A method as claimed in claim 14, comprising the step of:

accepting a minimum value of multicast cells by counting the multicast cells in number by a multicast cell counter unit.

* * * * *